US010833934B2

(12) United States Patent
Karthikeyan et al.

(10) Patent No.: US 10,833,934 B2
(45) Date of Patent: Nov. 10, 2020

(54) ENERGY MANAGEMENT IN A NETWORK

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 330 days.

(21) Appl. No.: 15/740,502

(22) PCT Filed: Jun. 30, 2016

(86) PCT No.: PCT/EP2016/065422
§ 371 (c)(1),
(2) Date: Dec. 28, 2017

(87) PCT Pub. No.: WO2017/001623
PCT Pub. Date: Jan. 5, 2017

(65) Prior Publication Data
US 2018/0183670 A1    Jun. 28, 2018

(30) Foreign Application Priority Data

Jun. 30, 2015  (EP) .................................... 15275166
Sep. 28, 2015  (EP) .................................... 15187163
(Continued)

(51) Int. Cl.
*H04L 12/24*     (2006.01)
*H04L 12/26*     (2006.01)
(Continued)

(52) U.S. Cl.
CPC ........ *H04L 41/0833* (2013.01); *H04L 41/145* (2013.01); *H04L 41/5025* (2013.01);
(Continued)

(58) Field of Classification Search
CPC . G06F 1/3287; G06F 1/3203; H04L 41/0833; H04L 41/145; H04L 41/5025;
(Continued)

(56) References Cited

U.S. PATENT DOCUMENTS 6,631,135 B1   10/2003   Wojcik
6,690,929 B1   2/2004    Yeh
(Continued)

FOREIGN PATENT DOCUMENTS

EP    1 016 261    7/2000
EP    1 374 486    1/2004
(Continued)

OTHER PUBLICATIONS

International Search Report for PCT/EP2016/065422 dated Sep. 23, 2016, 3 pages.
(Continued)

*Primary Examiner* — Ji H Bae
(74) *Attorney, Agent, or Firm* — Nixon & Vanderhye P.C.

(57) ABSTRACT

A network management method is described for managing energy utilisation in a network comprising network elements that handle network traffic. The network elements are analysed to identify at least one candidate network element for energy usage reduction. Routes passing through the candidate network element are then identified and at least one alternative route is identified for each identified route. Each identified route is switched onto the at least one alternative route, wherein the alternative route does not pass through the original candidate network element. Finally, the candidate network element is triggered to enter a lower power mode.

(Continued)

In a particular embodiment, a quality of service level associated with each identified route is determined and the method ensures that the alternative route has an associated quality of service level equal to or better than the original quality of service level. Systems and apparatus for implementing the method are also described.

19 Claims, 3 Drawing Sheets

(30) Foreign Application Priority Data

Sep. 30, 2015 (EP) .................................... 15187813
Mar. 24, 2016 (EP) .................................... 16162450

(51) Int. Cl.
| H04L 12/721 | (2013.01) |
| H04L 12/707 | (2013.01) |
| H04L 12/725 | (2013.01) |
| G06F 1/3287 | (2019.01) |
| G06F 1/3203 | (2019.01) |

(52) U.S. Cl.
CPC ........ H04L 43/0876 (2013.01); H04L 45/124 (2013.01); H04L 45/22 (2013.01); H04L 45/302 (2013.01); G06F 1/3203 (2013.01); G06F 1/3287 (2013.01); H04L 43/08 (2013.01)

(58) Field of Classification Search
CPC ... H04L 43/0876; H04L 45/124; H04L 45/22; H04L 45/302; H04L 43/08
USPC .......................... 713/300, 320; 709/238, 239
See application file for complete search history.

(56) References Cited

U.S. PATENT DOCUMENTS

| 7,668,946 | B1 | 2/2010 | Garcia-Franco et al. |
| 7,715,312 | B2 | 5/2010 | Khasnabishi |
| 8,073,455 | B1 | 12/2011 | Xie et al. |
| 8,797,867 | B1 | 8/2014 | Chen |
| 9,092,223 | B1* | 7/2015 | Pani ............... G06F 1/3209 |
| 2001/0013067 | A1 | 8/2001 | Koyanagi et al. |
| 2002/0174227 | A1 | 11/2002 | Hartsell |
| 2003/0112762 | A1 | 6/2003 | Hasan Mahmoud et al. |
| 2004/0120705 | A1 | 6/2004 | Friskney et al. |
| 2005/0083762 | A1 | 4/2005 | Rui et al. |
| 2005/0102414 | A1 | 5/2005 | Hares et al. |
| 2006/0187817 | A1 | 8/2006 | Charzinski et al. |
| 2007/0230363 | A1 | 10/2007 | Buskens et al. |
| 2007/0268827 | A1 | 11/2007 | Csaszar |
| 2008/0008091 | A1 | 1/2008 | Yumoto |
| 2008/0065318 | A1 | 3/2008 | Ho |
| 2008/0232247 | A1 | 9/2008 | Evans |
| 2009/0245130 | A1 | 10/2009 | Bing |
| 2010/0100525 | A1 | 4/2010 | Huang |
| 2010/0214920 | A1 | 8/2010 | Tewani et al. |
| 2010/0265826 | A1 | 10/2010 | Khasnabish |
| 2011/0087522 | A1 | 4/2011 | Beaty et al. |
| 2011/0142060 | A1* | 6/2011 | Manral ............... H04L 45/12 370/401 |
| 2011/0270972 | A1 | 11/2011 | Mukherjee et al. |
| 2012/0082057 | A1* | 4/2012 | Welin ............... H04L 12/12 370/252 |
| 2012/0140637 | A1* | 6/2012 | Dudkowski ............ H04L 45/00 370/238 |
| 2012/0295609 | A1* | 11/2012 | Li ............... H04W 24/04 455/423 |
| 2013/0144550 | A1 | 6/2013 | Czompo |
| 2013/0275567 | A1 | 10/2013 | Karthikeyan et al. |
| 2013/0275589 | A1 | 10/2013 | Karthikeyan et al. |
| 2013/0311673 | A1 | 11/2013 | Karthikeyan |
| 2014/0046880 | A1 | 2/2014 | Breckenridge |
| 2014/0052850 | A1 | 2/2014 | Doorhy et al. |
| 2014/0192677 | A1 | 7/2014 | Chew et al. |
| 2015/0074283 | A1 | 3/2015 | Karthikeyan et al. |
| 2015/0098338 | A1 | 4/2015 | Bhattacharya |
| 2015/0332155 | A1 | 11/2015 | Mermoud |
| 2015/0381648 | A1 | 12/2015 | Mathis |
| 2016/0171398 | A1 | 6/2016 | Eder |
| 2016/0344604 | A1 | 11/2016 | Raleigh |
| 2018/0191606 | A1 | 7/2018 | Karthikeyan et al. |
| 2018/0191621 | A1 | 7/2018 | Karthikeyan et al. |
| 2018/0191635 | A1 | 7/2018 | Karthikeyan et al. |

FOREIGN PATENT DOCUMENTS

| EP | 1 401 161 | 3/2004 |
| EP | 1 453 256 | 8/2005 |
| EP | 1 248 431 | 10/2007 |
| EP | 1 993 231 | 11/2008 |
| EP | 2 151 951 | 2/2010 |
| EP | 2 261 811 | 12/2010 |
| EP | 2 430 801 | 3/2012 |
| EP | 2 469 756 | 6/2012 |
| EP | 1 875 693 | 8/2012 |
| WO | 99/14931 | 3/1999 |
| WO | 02/080458 A1 | 10/2002 |
| WO | 2006/116308 | 11/2006 |
| WO | 2011/076282 | 6/2011 |
| WO | WO 2011/124236 | 10/2011 |
| WO | 2012/085520 | 6/2012 |
| WO | 2012/085521 | 6/2012 |
| WO | WO 2012/155987 | 11/2012 |
| WO | 2013/144550 | 10/2013 |
| WO | 2014/068268 | 5/2014 |
| WO | 2014/068270 | 5/2014 |
| WO | WO 2014/070164 | 5/2014 |
| WO | 2017/001628 | 1/2017 |
| WO | 2017/001629 | 1/2017 |

OTHER PUBLICATIONS

Examination Report issued in EP Application No. 16 733 597.5 dated Sep. 12, 2019 (9 pages).
Ananya Das "Maximizing Profit Using SLA-Aware Provisioning", 2012 IEEE Network Operations and Management Symposium (NOMS), Math & Computer Science Department, Lake Forest College, Apr. 16, 2012 (8 pages).
Office Action dated Nov. 13, 2019 issued in U.S. Appl. No. 15/740,832 (12 pgs.).
Office Action dated Nov. 13, 2019 issued in U.S. Appl. No. 15/740,837 (11 pgs.).
Advisory Action dated Oct. 8, 2019, issued in U.S. Appl. No. 15/740,520 (3 pages).
Nedevschi, et al. "Reducing Network Energy Consumption via Sleeping and Rate-Adaptation", NSDI '2008: 5th USENIX Symposium on Networked Systems Design and Implementation USENIX Association (14 pages).
Gupta, et al. "Greening of the Internet", SIGCOMM '03, Aug. 25-29, 2003, (8 pages).
International Search Report and Written Opinion issued in PCT/EP2016/065422 dated Sep. 23, 2016, (16 pages).
Search Report issued in GB 1605194.8, dated Oct. 31, 2016 (7 pages).
Gelenbe, et al., "Reducing Power Consumption in Wired Networks", Computer and Information Sciences, 2009, ISCIS, 2009, 24th International Symposium on IEEE, METU Northern Cyprus Campus, Sep. 14-16, 2009, (6 pages).
U.S. Appl. No. 15/740,832, filed Dec. 29, 2017 (29 pages).
International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs",

(56) References Cited

OTHER PUBLICATIONS

2015 $2^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
International Search Report and Written Opinion of PCT/EP2016/065429, dated Sep. 5, 2016 (16 pages).
Search Report dated Apr. 28, 2016 issued in GB1517110.1 (7 pages).
International Search Report and Written Opinion of the International Searching Authority dated Sep. 23, 2016, issued in International Application No. PCT/EP2016/065431 (15 pages).
U.S. Appl. No. 15/740,837, filed Dec. 29, 2017 (33 pages).
Extended European Search Report dated Nov. 26, 2015 issued in European Application No. 15275166.5 (5 pages).
Tanja Zseby and Sebastian Zander, "Sampling Schemes for Validating Service Level Agreements", Centre for Advanced Internet Architectures, CAIA Technical Report 040706A, Jul. 2004 (6 pages).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pages).
U.S. Appl. No. 15/740,520, filed Dec. 28, 2017 (29 pages).
Office Action dated Apr. 19, 2019 issued in U.S. Appl. No. 15/740,837 (14 pages).
Office Action dated Oct. 17, 2018 issued in U.S. Appl. No. 15/740,837 (11 pages).
Advisory Action dated Aug. 2, 2019 issued in U.S. Appl. No. 15/740,837 (4 pages).
Office Action dated Apr. 19, 2019 issued in U.S. Appl. No. 15/740,832 (12 pages).
Office Action dated Oct. 17, 2018 issued in U.S. Appl. No. 15/740,832 (11 pages).
Office Action dated Nov. 2, 2018 issued in U.S. Appl. No. 15/740,520 (13 pages).
Office Action dated May 30, 2019 issued in U.S. Appl. No. 15/740,520 (16 pages).
Office Action dated Mar. 4, 2020 issued in U.S. Appl. No. 15/740,520 (19 pgs.).

\* cited by examiner

ENERGY MANAGEMENT IN A NETWORK

This application is the U.S. national phase of International Application No. PCT/EP2016/065422 filed Jun. 30, 2016 which designated the U.S. and claims priority to EP Patent Application No. 15275166.5 filed Jun. 30, 2015, EP Patent Application No. 15187163.9 filed Sep. 28, 2015, EP Patent Application No. 15187813.9 filed Sep. 30, 2015 and EP Patent Application No. 16162450.7 filed Mar. 24, 2016, the entire contents of each of which are hereby incorporated by reference.

BACKGROUND AND SUMMARY

The present invention relates to the field of network management, in particular the management of a network in relation to its energy usage and the energy usage of devices within the network.

Network devices used to implement large-scale computer networks are high consumers of energy and often consume significant energy even when they are not carrying significant volumes of network traffic. However, when a client device selects a QoS, and therefore a route for a particular traffic flow, it is more important to the client to ensure reliable and fast transfer of the data across the network than to be concerned about the energy consumed in effecting the transfer. Typically, it is the network operator who might be concerned about energy usage in the network but actions to manage energy usage can drive network traffic to other operators if aggressive energy management causes a shortfall in capacity on the network.

According to one aspect, there is provided a network management method for managing energy utilisation in a network comprising a plurality of network elements for handling network traffic, the method comprising:
- analysing the network elements to identify at least one candidate network element for energy usage reduction;
- identifying routes passing through the at least one candidate network element;
- identifying at least one alternative route for each identified route;
- switching each identified route onto the at least one alternative route, wherein the alternative route does not pass through the at least one candidate network element; and
- triggering the at least one candidate network element to enter a lower power mode.

The method can be used to enable a network operator to manage proactively the energy usage of a network, in particular, the method can be used to enable optimisation between energy consumption and traffic demands. Using the present method, the network does not need to rely upon setting arbitrary caps on the total energy used for a route or upon a client selecting an energy-efficient route, which may not be in their best interests. Instead, the method can enable intelligent reshaping of the network to provide more energy efficient usage of the network as a whole and of routing through the network.

In one embodiment, identifying routes passing through the at least one candidate network element comprises identifying a quality of service level associated with each identified route. Hence, the network can be managed proactively to maximise energy saving while being aware of QoS factors.

Optionally, in a QoS-aware embodiment, identifying at least one alternative route comprises identifying at least one alternative route having an associated quality of service level equal to or better than the quality of service level associated with each identified route. Hence energy savings can be achieved while controlling the quality of service offered and delivered to network traffic.

Optionally, analysing the network elements comprises ranking the network elements according to a level of traffic utilisation at each network element. The utilisation may comprise an average or cumulated utilisation over a preceding time period, for example the preceding 5 to 30 minutes. Ranking the network elements in this way can enable the system to identify the least used elements in the network and target them for energy usage reduction.

In particular, analysing the network elements may comprise identifying one or more network elements in the network having a low traffic utilisation.

In a further implementation, analysing the network elements comprises identifying one or more network elements in the network having a low traffic utilisation and a high energy utilisation. Hibernating or bringing these devices into a lower power mode will have maximum impact on the energy usage of the network as a whole while minimising the impact on traffic flows in the network.

Optionally, analysing comprises grouping the network elements into bands according to a level of traffic utilisation at each network element. The use of traffic bands, rather than a definitive ranking of each network element, can reduce the impact of fluctuations in network traffic levels on the present method. The exact order of traffic utilisation between devices in the network at a particular moment is less important than obtaining an indication of whether the network device falls within "low", "medium" or "high" utilisation bands. More than three bands may be provided depending for example on the number of devices to be analysed and the range of network traffic utilisation values seen across the network.

The skilled person will appreciate that it may also be sufficient simply to identify those devices that fall within a low traffic utilisation band and relative rankings of devices above a threshold low level of traffic utilisation is not necessary. Therefore, the analysis may simply identify a group of devices with a low traffic utilisation.

In the present embodiment, traffic utilisation can be considered to be the amount of traffic passing through, or being processed by, the network device within a predetermined time period. It will be appreciated that the traffic utilisation may alternatively be determined based on a measure of the percentage utilisation, or capacity, of each network device. For example, the network devices may be ranked from those that are close to 100% utilisation over a particular period down to those that are closer to 0% utilisation.

Optionally, the analysing further comprises ranking the network elements within a traffic utilisation band based on their level of energy utilisation, in particular to determine the network devices that have the highest levels of energy utilisation within a particular traffic band.

The analysis preferably leads to the system identifying at least one candidate network element having the highest level of energy utilisation within the band of lowest traffic utilisation.

Triggering the network element to enter a low power mode may comprise triggering the network element to enter a hibernation or sleep mode or to switch off. Optionally, the network device may be triggered to enter a mode in which it sends "heartbeat" or periodic refresh messages to keep active any tunnels that pass through the network device.

Preferably, the method further comprises maintaining a list of routes supported by a network element that is in a low power mode. Such routes may be maintained in memory in the network device itself, particularly if the network device is hibernating but has not turned off, or at a remote network element, such as a gatekeeper or central server. The routes and other configuration information may be repopulated to the network element if the network element is re-activated.

In one implementation, identifying routes passing through the at least one candidate network element comprises performing a lookup for routes passing through that network element. A central network element, or a distributed database, may store route information for the network including information relating to routes passing through each network element.

Optionally, identifying a quality of service level associated with each identified route comprises performing a lookup based on each identified route to determine a quality of service or a class of service associated with each route.

In one implementation, identifying at least one alternative route comprises identifying a plurality of alternative routes, each alternative route having an associated quality of service level equal to or better than the quality of service level associated with each identified route. This may enable selection of a preferred route. Alternatively, the method may further comprise load balancing traffic from each identified route across a plurality of alternative routes. The load balancing can be implemented to take into account traffic on network elements, and potentially the energy usage impact on those network elements, through which the alternative routes pass.

Optionally, the method further comprises determining an initial global energy utilisation of the network prior to analysing the network elements and determining a revised global energy utilisation of the network subsequent to switching each identified route onto the at least one alternative route. Hence the network can keep track of the overall impact that the network changes are having on the network as a whole.

The method may further include reversing the switching of each identified route, and potentially reactivating network elements if the revised global energy utilisation is greater than the initial global energy utilisation. The reversal of the network changes may take place in a stepwise manner, with each re-routing and hibernating step being reversed until the network reaches a minimum global energy utilisation. The determination of a global energy utilisation may be determined for a predetermined time period. This calculation may be performed each time one or more devices is triggered to enter a low power mode.

The method may also include re-analysing the network elements to identify at least one further candidate network element for power reduction. Hence an iterative process of analysis and hibernation of devices can continue to be repeated until the network as a whole has reduced or minimised its energy utilisation, without affecting quality of service on the network. The skilled person will appreciate that it can be useful to re-analyse the network elements following hibernation of one network element, since the traffic utilisation of other network elements may change significantly as a result of a network element entering a low power mode.

The further analysis may incorporate information network elements that are linked to the network element that was triggered into a low power mode. For example, network elements may be targeted for powering down if they are known to be neighbour nodes, or are part of the same route as, a network element that has been entered into a low power node. This may reduce the analysis needed to identify the next candidate network elements.

Furthermore, network routing information can be updated to indicate routes that are currently dormant due to one or more network elements being in a low power mode.

In one embodiment, the method further comprises identifying at least one network element that is currently in a low power mode that carries a route having a requested quality of service based on network routing information. This can enable the network to identify one or more devices that could be powered up or reactivated in order to service a request for transmission of traffic across the network.

The method may further comprise analysing network conditions and network traffic levels to determine whether to re-active at least one network element that is in low power mode. The analysis may include determining likely future levels of demand, for example based on modelling of the network and/or knowledge about typical or previous traffic patterns, enabling predictive re-engagement of network elements and resources.

In one embodiment, the method further comprises monitoring the performance of a plurality of quality of service models in the network to determine or identify a deterioration in the performance of at least one quality of service model.

Optionally, the method further includes re-activating at least one network element that is in a low power mode to increase capacity on the network.

The at least one network element may be reactivated following a request for routing of traffic over the network. Optionally, the at least one network element is reactivated selectively depending on characteristics of the request, for example the quality or class of service requested for the traffic flow.

In one embodiment, the method further comprises predicting a deterioration in the future performance of at least one quality of service model based on predicted network traffic. This can enable proactive re-activation of network elements based on expected traffic levels or specific expected traffic flows.

Optionally, the method includes re-activating a network element to the same state that the network element was in prior to hibernation. Hence tunnels previously operational on the network element may be reactivated and the network element status and settings can be restored.

In one embodiment, the method further comprises determining a gain associated with triggering a network element to enter a low power mode, wherein the gain is determined based on an amount of energy saved by triggering the network element to enter the low power mode. The gain may be determined based on the change in energy usage for the particular network element, or may be determined based on monitoring energy usage across the network or a segment of the network as the network element is powered down.

Optionally, the gain comprises a cumulative gain accrued over a predetermined time period, for example between 1 and 10 minutes. This can allow variations in network traffic effectively to be smoothed to provide a more realistic measure of the gain associated with the change that has been made.

Preferably, the embodiment further comprises determining a loss associated with maintaining a network element in a low power mode, preferably wherein the loss comprises a traffic loss. Hence the network may determine a measure of the traffic that has been turned away or serviced at a lower quality of service level as a result of the change that has been made. Preferably at least one of the loss and the gain measurements is converted or interpreted such that the loss and the gain can be expressed in the same units.

In one embodiment, determining a loss is based on determining an expected level of demand, and an associated expected loss, within a future time period or at a future time. This can enable the network to reinstate or reactivate network elements that are in a low power mode prior to a significant loss being incurred, and hence avoid the loss.

The method may further include making a periodic prediction of a loss incurred from maintaining a network element in a low power mode. This can allow periodic review of the effects of maintaining the network element in the low power mode.

Optionally, the loss is further based on a change in demand or a trend in a change in demand for traffic on a route supported by the network element.

Alternatively, or in addition, the loss may be based on performance deterioration for a quality of service model offered by a route supported by the network element. As the quality of service that is capable of being delivered decreases, the loss increases to eventually trigger reactivation of one or more network devices.

Optionally, the method further comprises determining a probability associated with the loss and combining the probability with the loss to calculate a measure of an expected loss. For example, if a high loss has a low probability of occurring, converting this to a low "expected loss" would prevent the network from taking action on the basis of an event that is unlikely to happen. A low loss that has a high probability of occurring may be more significant in the network, and may require a greater response from the network, than a high loss that has a low probability of occurring.

Preferably, the method further comprises reactivating the network element if the loss subtracted from the gain is below a threshold level.

In one embodiment, the method also includes recording a set of network status parameters. Optionally, the network status parameters comprise at least one of: the time of day, geographic location, upstream and downstream logical or physical neighbours, the traffic on the network QoS model, the traffic on other QoS models, the number of routes that support a given QoS model, a forecast of expected traffic and a forecast of likely outages.

The method may further include storing the values of a plurality of network status parameters when a network element is triggered to enter a low power mode. The network status parameters may be stored in a central network element. Preferably, the network status parameters further include parameters relating to the network element that is being triggered to enter a low power mode.

Embodiments may also include triggering a network element to enter the low power mode when the network status corresponds to the stored values of a plurality of the network status parameters. Hence the triggering may occur proactively once the network has learnt features of the network status that enable the network element to enter a low power mode. This can bypass some of the analysis that needs to be done in the network.

Optionally, the method further includes identifying a network element as a candidate network element when the network status corresponds to the stored values of a plurality of the network status parameters. Hence the triggering of the element into a low power state may not be done automatically, but this embodiment can enable more efficient identification of which network elements should be shortlisted for the low power mode.

Similarly, the method may further include storing the values of a plurality of network status parameters when a network element is reactivated.

Optionally, in this embodiment, the method may include triggering a network element to reactivate when the network status corresponds to a plurality of the stored values of the network status parameters or identifying a network element as a target for reactivation when the network status corresponds to a plurality of the stored values of the network status parameters.

Embodiments of the method may also include establishing and maintaining, based on past network behaviour, one or more rules for identifying a network element as a candidate network element.

Embodiments of the method may also include establishing and maintaining, based on past network behaviour, one or more rules for triggering a network element into a low power mode or reactivating a network element.

According to a further aspect, there is provide apparatus for managing energy utilisation in a network comprising a plurality of network elements for handling network traffic, the apparatus comprising:

means for analysing the network elements to identify at least one candidate network element for energy usage reduction;

means for identifying routes passing through the at least one candidate network element;

means for identifying at least one alternative route for each identified route;

means for switching each identified route onto the at least one alternative route, wherein the alternative route does not pass through the at least one candidate network element; and means for triggering the at least one candidate network element to enter a lower power mode.

The apparatus may further include means for implementing a method according to any of the preferred features set out above in relation to the method aspect.

According to a further aspect, there is provided apparatus for managing energy utilisation in a network comprising a plurality of network elements for handling network traffic, the apparatus comprising:

a memory for storing a sequence of instructions for implementation on a processor;

an interface for receiving information from and communicating information to network elements in the network;

a processor for implementing the sequence of instructions to:

analyse the network elements to identify at least one candidate network element for energy usage reduction;

identify routes passing through the at least one candidate network element;

identify at least one alternative route for each identified route;

switch each identified route onto the at least one alternative route, wherein the alternative route does not pass through the at least one candidate network element; and trigger the at least one candidate network element to enter a lower power mode.

According to further aspects, there are also provided apparatus, a system, a computer readable medium or computer program product comprising software code adapted, when executed on a data processing apparatus, to perform any method as set out herein. Any feature in one aspect may be applied to other aspects, in any appropriate combination. In particular, method aspects may be applied to apparatus and computer program aspects, and vice versa. Furthermore, features implemented in hardware may generally be implemented in software, and vice versa. Any reference to software and hardware features herein should be construed accordingly.

BRIEF DESCRIPTION OF THE DRAWINGS

Embodiments will be described in more detail with reference to the figures in which.

DETAILED DESCRIPTION OF PRESENT EXAMPLE EMBODIMENTS

By way of background, as described in more detail below, the present system may be implemented in an environment of dynamic QoS models and some of those models can be related to energy utilisation. This can enable a client to request, in their set of desired QoS models with an associated priority, the best possible energy behaviour, i.e. a route with the lowest energy utilisation that still satisfies their performance criteria. Alternatively, or in addition, an operator can enforce a priority list, one of those being energy utilisation, and prefer routes that provide optimal energy utilisation over ones that do not. This operator-enforced priority is important if the operator finds that the clients do not choose such priorities as they are likely to benefit the operator more than the client. Furthermore, an operator can choose to incorporate energy utilisation into the dynamic pricing model. It is also possible for a network operator to enforce a maximum bound in energy utilisation which enforces the gatekeeper to restrict its search to routes that have an energy utilisation below the specified bound and reject requests that cannot be satisfied within this constraint. Alternatively, the operator can choose to not enforce an upper bound at all, in which case, the gatekeeper will choose the most energy efficient route that is currently available and satisfies the clients' priority list but this route can still be very energy-consuming.

The most control the operator has in all of the examples set out above is when an upper bound is set to limit energy consumption at this threshold and not choose routes that exceed this value. However, this is a crude way of encouraging energy efficiency because the operator might not know what the best possible energy performance can be that still satisfies the clients' requests. In setting a hard threshold in utilisation across the entire network segment, the operator might either not drive down energy usage as much as possible or alternatively reject traffic without realising that the threshold is too low. The trade-off between the gain in having available infrastructure in use versus the gain from saving resources when not in use is not explicitly handled and therefore not optimised. Also, it can be too tedious to set thresholds for every segment as this requires knowledge of expected traffic in that segment traded-off against gain in saving the resources. Also, the suggestions above do not include the switching off of any infrastructure but only divert traffic away to routes that are more energy efficient.

Therefore, as set out above, there are described herein methods of managing components in a network to improve energy consumption across the network, but taking into account factors such as QoS, current and future traffic demands. There are also described herein networks and network elements in and by which the described methods can be implemented, and an exemplary network is illustrated in FIG. 1.

Figure 1:
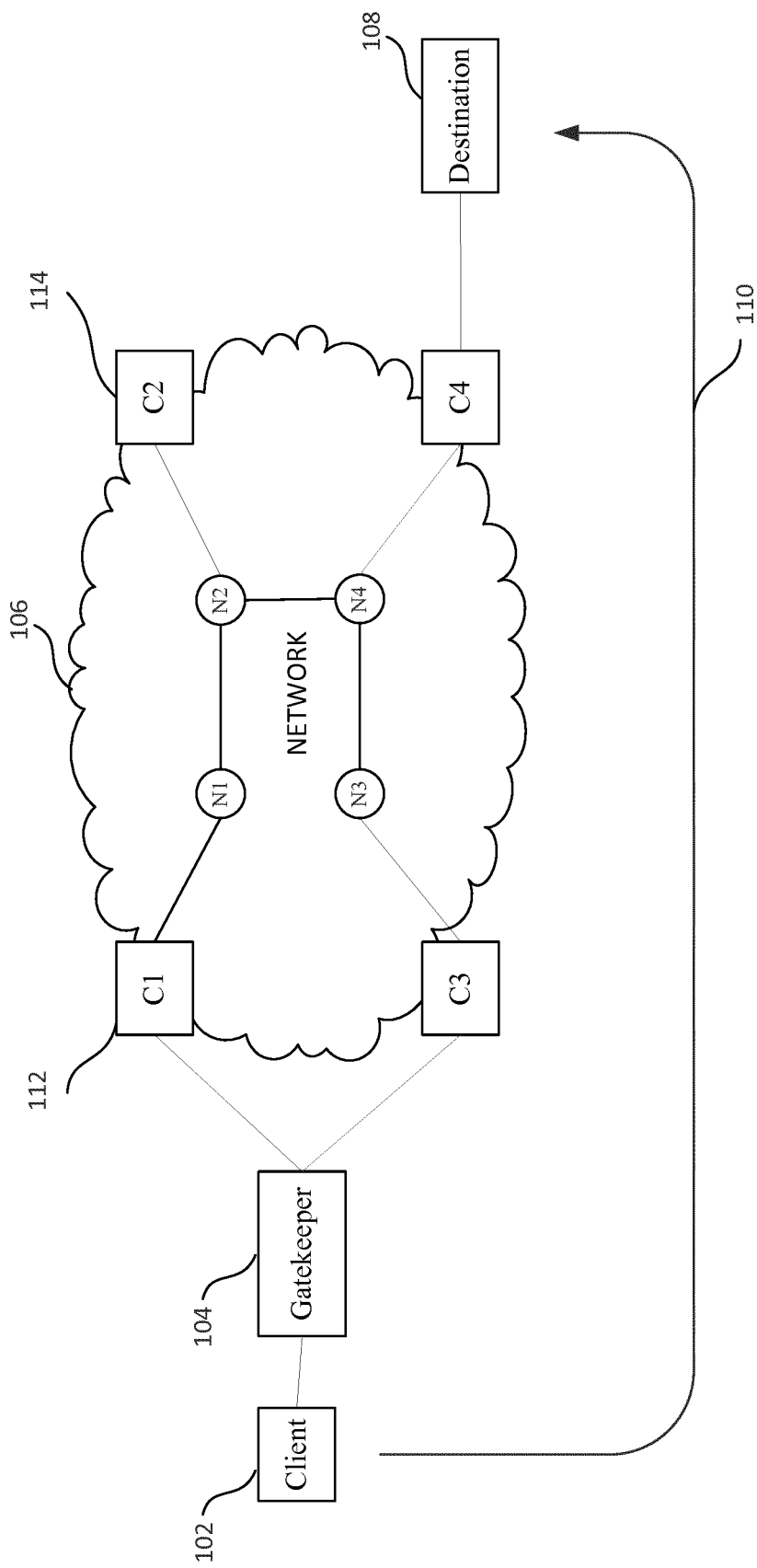
FIG. 1 is a schematic diagram of a network in which the systems and methods described herein may be implemented.

FIG. 1 illustrates a typical scenario in which a client 102 wishes to send a data flow to a given destination 108. The data flow is conceptually represented by arrow 110. Note that the terms "client" and "destination" are used merely to refer to the originator and recipient of the data flow respectively, such that the client is in the role of acquiring and consuming network resources, and do not imply a client/server type relationship. For example, the client could be a media streaming system and the destination could be a user device such as a media player.

The data flow is to be carried across a network 106, which includes a number of interconnected edge nodes C1-C4 and internal nodes N1-N4 (the number of nodes and interconnections depicted are chosen purely for example purposes). The network can thus provide various routes between pairs of edge devices, which can carry data flows, such as C1-N1-N2-C2, C1-N1-N2-N4-C4 etc. Each of these routes may have different performance characteristics, for example in terms of packet loss or delay and will also have different levels of energy usage.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics.

In a simple example, the available QoS models may be predefined and largely fixed. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour). However, preferred embodiments operate in the context of a system which monitors performance characteristics of the network and dynamically identifies classes of service that the network can support. This is based on an iterative learning process, in which various metrics are measured for actual flows traversing the network. For example, a given flow may be associated with a performance metric vector $p=<m\_1, m\_2, \ldots m\_n>$. Each metric corresponds to a different feature of the flow (e.g. packet latency, packet loss, jitter etc.)

A learning algorithm then performs a clustering analysis on the measured metric vectors to identify representative metric vectors that indicate distinct network behaviours (these are referred to as prototypes). The representative metric vectors then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics.

When "learning" a QoS model, the system keeps a record of all routes that support the model (i.e. the routes carrying the data flows which were the basis for the model). Thus, in addition to the model definitions themselves, the learning process produces a mapping that maps QoS models to routes. For example, a low packet loss QoS model may be associated with route C1-N1-N2-N4-C4, whilst a low packet delay model may be associated with route C3-N3-N4-C4. Later, when routing a data flow tagged for a given Class of Service corresponding to one of the QoS models, the network (e.g. the gatekeeper) selects a route associated with that QoS model to carry the data flow.

Referring back to FIG. 1, the learning algorithm is implemented in a QoS learning module, which may be part of the gatekeeper 104 or may be implemented separately, e.g. in a dedicated server. In a preferred embodiment, the QoS learning module continues to monitor data flows in the network, and repeats the described learning process at periodic intervals. As a result the set of available QoS models may evolve over time, adapting to resource availability and demand in the network. However, such a dynamic system can make it more difficult for clients wishing to reserve resources for data flows to know what performance characteristics can be supported by the network at any given time. Furthermore, it may be the case that no single QoS model accurately represents the service characteristics desired by the client at that time.

Methods relating to switching off network elements or devices within the network are now described below, followed by examples of methods of triggering devices out of hibernation. The hibernation process is then described in more detail, including a discussion of the retention of data structures in hibernated devices in a network implementing dynamic QoS. The network elements affected by the methods described herein include edge nodes C1-C4 and internal nodes N1-N4.

Further methods relating to dampening oscillation and maximising gain in the face of predicted loss due to unavailability of resource are then described. Finally, a worked example is given.

Note that the method described below to turn devices off does not have to be joined with the method to turn devices on. The two systems are essentially decoupled but do work together.

The first step is to identify a target device to switch off. One method of doing this is to sort all devices, first by traffic utilisation, in particular into traffic utilisation bands, and second by energy use within those traffic utilisation bands. The devices that use the highest energy and have the lowest traffic utilisation can then be selected as a starting point for the system. As time progresses, the list can be updated and subsequent targets can be chosen by working through this list sequentially. The next device chosen will have the second highest energy utilisation within the list of devices with lowest traffic utilisation until all the devices within a traffic utilisation bracket have been dealt with at which point the next device to be targeted belongs to the second lowest traffic utilisation.

The sorting enables the present system to have as little impact on the traffic as possible and the system then gradually works its way upwards with energy utilisation optimisation. If the network started by selecting the nodes that were the highest energy consumers, these could also be the highest traffic bearers and therefore whilst the gain from switching them off would be high, the risk of making a decision detrimental to network performance is also high.

Other methods of determining a list of target devices to switch off are also envisaged, for example based on network topology, patterns of historical network usage and other similar methods.

The second step is to identify all the routes that are supported by the targeted device. The network of routes over a device can be meshed in any way and therefore different routes can pass through different upstream and downstream devices to each other. Such mapping of routes over devices can be obtained from a topology repository. Some of these 'routes' can be tunnels that support VLANs or other reservations on a number of interfaces on the device. Every device can have many interfaces and each of these interfaces can carry multiple tunnels or flows of traffic. The task is to identify such flows—this can be single flows or aggregates of flows that reach a common sub-network or have a common Class of Service (CoS) treatment. The granularity of the flow is not important. However, note that the bigger the changes made to divert traffic away from this device, the quicker the device can be turned off and the fewer iterations the next step will take. But the bigger the size of traffic flows to re-route, the more diverse the traffic might be and the fewer alternative routes there might be to which they can be re-routed. Also, even for the same traffic CoS, the size of the traffic to be re-routed has an impact on the number of options there might be available to which the traffic can be re-routed. These are design decisions to be taken into account.

Although it is not necessary for an implementation of the invention, the present embodiment assumes a dynamic QoS model environment where profiling of routes according to various QoS criteria has already taken place. Note that the QoS models do not have to be dynamic; the QoS models do not have to change over time but methods described herein deal with the complexity of such an environment. A simpler embodiment where the QoS models do not change over time would be straightforward for the skilled person to implement based on the present description.

The 'flow' granularity question is solved for this example by assuming that a tunnel reservation system might exist on each of the interfaces which exists to support static/dynamic QoS models. One or more tunnels can exist on a single interface but each of those tunnels carries traffic of a single CoS. If this is the case, the granularity for re-routing is at the level of the tunnel itself, i.e. a single Class of Service. If sub-pools and DS-TE (DiffServ-Aware Traffic Engineering) has been used to share a tunnel across multiple Classes of Service, a single sub-pool might the defined 'flow' which must now be re-routed proactively in the next step. The present system is just as implementable in an environment where reservations have not been made and scheduling/traffic shaping has been pre-defined as in the case of classic DiffServ. In this case, a 'flow' becomes a single CoS supported on the device.

Henceforth, having mapped the relationship of CoS to a tunnel or sub-pool, this infrastructure is referred to herein as a 'route' and it is assumed that all traffic in a given route desires the same treatment. A 'route' is merely a pathway through the network where all the traffic on this route somehow desires the same treatment and is destined for the same location or sub-network.

Knowing the routes that must be mapped off the device, these routes are now load balanced across other routes that support the same QoS model. In particular, the system must trigger load balancing across routes that support the same or better QoS models in order to free up resource on the target device even if the device's performance is acceptable and it still supports the QoS model itself. In this manner, the system is proactive in its actions and makes changes in the network in order to optimise a different criterion (energy utilisation) without needing to make this change due to performance issues. The routes to which the flow is to be remapped should support a QoS model of the same features or better but not worse.

The output of the load balancing function is to determine a split, preferably an optimal split of traffic from the target route which traverses the target device onto other routes that do not traverse the target device. Note that this might not necessarily result in a local re-route.

Figure 2:
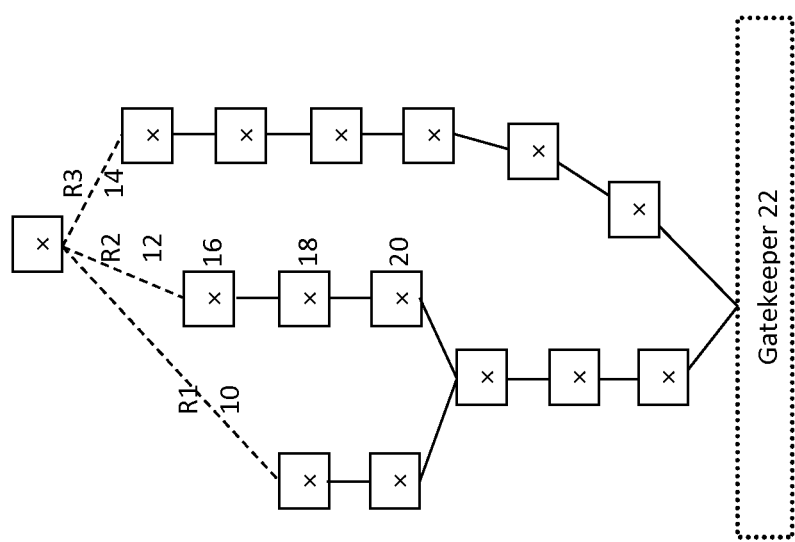
FIG. 2 illustrates a network route configuration according to one embodiment.

FIG. 2 shows a possible network route configuration. Routes R1, R2 and R3, 10, 12, 14 support the same CoS and therefore R1 and R2 are viable options for a re-route from R2 due to device 16 being targeted for hibernation. Note that routes R1 10 and R2 12 share the same infrastructure from the gatekeeper on the first three devices. In this instance, the load balancer will look for the best distribution of traffic which has the least impact on existing traffic and best likelihood of maintaining desired QoS. It might find, for example, that this can be achieved with a 60-40 split across R1-R3. Note that it is not advisable to split a single session onto multiple paths. Aggregates of sessions can be split instead and it is likely that a single CoS contains many sessions. Knowing this outcome from the load balancer, the gatekeeper can effect this change by re-labelling future traffic for route R2 12 at the head-end onto routes R1 10 and R3 14 with the recommended distribution. Note the re-route here happens on an end-to-end basis rather than locally around device 16, for example using data that is already collected for traffic profiling. Local re-routes are also possible if the intelligence for finding the best local detour is identified in a manner that the requested QoS can still be maintained. Note that it is also possible that not all traffic is remapped actively. It is possible that some classes of service that are not guaranteed on loss can be left as they are and the route recovery mechanism finds such traffic an alternative pathway after the device enters hibernation. The re-map procedure is only important for services that must be treated proactively rather than left to recover once the change has been made.

The above re-route process occurs until all traffic has been diverted away from the device 16. One possible outcome is that this is successful following which the target device 12 is now hibernated. Other devices might also be freed up in the process (for example, devices 18 and 20 in the diagram) which are also hibernated as well. This action has therefore hibernated 3 devices when only one was initially targeted since the others were on the same end-to-end route where all traffic has been removed. Note that it is possible that devices 18 and 20 carry traffic of other CoS, in which case an updated list of targeted devices will aid to find the next best device to hibernate (which may or may not be 18 and 20). If devices 18 and 20 only support one end-to-end route (which has now been remapped to R1 and R3), the updated target device list will now move these devices to the top of the target list with no traffic utilization but non-zero energy usage, in which case they will be hibernated as the next set of devices anyway.

However, it is possible that one of the traffic flows cannot be diverted to another route. If this occurs, the next step is to verify if the actions performed so far are to the improvement of the global goal or alternatively to the detriment of the global goal. The global goal can be defined as the minimisation of energy utilisation across the network without compromising on QoS performance. Therefore, if the overall energy consumption in the network (which can be measured) is less than it was before the changes were made, then the change is to be kept as an acceptable local minimum. However, having reached this local minimum, if it found that the system has deviated away from the global minimum instead of moving towards it, the load balancing action is reversed. Note that it is possible that the reversal need not happen entirely and that smaller incremental steps to reverse can be taken and the global goal can be measured after each step. This slows down the system response time but is more likely to find a better global minimum point as the search space is widened. These are all variations of local search methods. The important aspect here is the comparison of the local minimum to the global minimum and if the global system moves away from the goal than towards it, the action is reversed as much as desired.

If this has occurred and the reversal is complete, the next target is chosen from the original list of targeted devices and the method is repeated.

Described below is an enhancement on the decision to hibernate a device when all the traffic has been re-routed successfully. For the purpose of the description above, however, assume that once all the traffic is re-routed, the device is hibernated in accordance with the capabilities of the skilled person.

There are now described conditions for switching devices back on. Two conditions are proposed to make this change. The first is when performance of an existing QoS model deteriorates such that the real-time performance deviates sufficiently from agreed QoS on that QoS model to be considered a breach. Note that this can be a prediction into the future. The second condition is when the demand profile for a QoS model necessitates more resources in order to not risk turning away desirable traffic. Note that this can be done selectively for some types of traffic only based on the desirable traffic features that the operator would like to encourage.

If a breach in performance of a QoS model has been forecast or is detected, the gatekeeper attempts to re-route traffic through alternative paths that support the desired QoS behaviour using the load balancing function in addition to withdrawing the QoS model from future services as well. However, the skilled person will appreciate that it might be possible that load balancing across existing active segments is not enough to improve deteriorating QoS. In this case, once the gatekeeper determines that load balancing over active segments is not sufficient, it triggers hibernating devices on routes that support this QoS model to wake up and therefore automatically deploy resources to the QoS model.

The second condition relates to forecasting a demand profile based on client request information and other predictive information collected at the gatekeeper. A sample repository of this information is shown in the table below:

| Request ID | Jitter | Loss | Delay | Resilience | Energy | Load distribution | Source | Destination |
|---|---|---|---|---|---|---|---|---|
| 1 | J1 | L1 | D1 | ✓ | ✓ | x | C1 | C2 |
| 2 | x | L2-L3 | x | x | x | ✓ | C3 | C4 |
| 3 | ✓ | ✓ | D2-D3 | ✓ | x | x | C1 | C4 |

Forecasting methods for determining future network requirements based on data such as that set out above can be employed as a trigger condition for re-deploying dormant resources.

The methods described above refer to automatic hibernation of devices as an action point following successful remap of traffic. Note that this can also take the form of switching off entirely or powering down to a level where the processing resources are turned off but the device itself continues to send heartbeat messages to keep links alive. This can also take the form of sending REFRESH messages for any tunnels on the interfaces. It is assumed that powering down a device to this state where it only sends heartbeat messages but does participate in active routing of packets is more efficient than running the device with full functionality. However, in the case when this is not possible, the entire device can hibernate such that its tunnels are also torn down (due to lack of periodic refresh messages). Note that in this case, the gatekeeper holds a record of devices and the routes supported by these devices that are currently hibernating and is therefore able to power them back up when the resources are needed again. An example of such a record is shown in the table below, which shows a sample repository held in intelligence entity mapping routes to the devices that are hibernated on them:

| Routes | QoS Models that the route is part of | Hibernated Devices on this route |
|---|---|---|
| R1 | Q1, Q2 | D1, D2, D4, D5 |
| R2 | Q1 | D1, D3, D4 |

A principal learning component implemented in the network to manage and advertise routes associated with particular QoS may also be used to hold a record of all the routes that support a specific QoS model (i.e. the information contained in the first two columns of the table above perhaps represented differently as routes against QoS models as opposed to QoS models that the routes are a part of). Such records must be updated to mark dormant routes or segments of routes as being so. This allows the gatekeeper to know which routes support which QoS models and therefore be able to wake the right devices up when the routes are required again.

Note also that QoS models with routes with segments that are hibernating should not be deleted from the repository of QoS models but should only be invalidated when they are no longer to be advertised (either in the next iteration of the principal learning component or when capacity is no longer available in the intermediate period between learning iterations).

Additionally, aggregation of multiple QoS models to reduce dimensionality can proceed unaffected but the system can carry over hibernating segment information as it is held before consolidation. Once consolidated, routes that belong to the consolidated new QoS model will be assumed to support the new model and will therefore be woken up when demand for the consolidated QoS model arises at a later time. QoS models with hibernating segments will continue to be offered to clients and the choice of whether or not to advertise the bandwidth available but currently dormant to end clients is left to the operator. The unused segments can still be advertised and brought out of hibernation if necessary by the gatekeeper, subject to demand.

Note also that when a device emerges from hibernation, it must be instructed to re-establish tunnels, reservations, scheduling profiles and traffic shaping functions as they were before in order to restore its connectivity to the point in time when it hibernated. This information can be held locally in the device before hibernation or alternatively pushed from the intelligence entity as signalling during re-boot. Suitable protocols for communicating this information might include the ERO object used for RSVP-TE for MPLS tunnel connectivity information.

Once a device or segment has been triggered out of hibernation, such devices must also be marked as being active or removed from the repository of information relating to hibernating devices. Also, such updates should be carried through to the data collected and prepared by the principal learning component, if applicable in order to fully incorporate this segment into active network routing behaviour and profiling again.

It will be understood from the discussion above that when all the traffic has been re-mapped to alternative routes on QoS models that are same or better, a device will be entered into hibernation. Similarly, a device is switched back into action when the demand for this device has risen, either due to performance deterioration of one or more QoS models that are supported by the route or due to a forecast of one or more of these QoS models from the demand profile.

However, a potential limitation of such immediate action in some implementations is that the system is likely to oscillate. For example, a change can be made which might be reversed in a short period of time because the environment has changed and the demand for the change to be reversed has risen. In this case, it is possible that demand for resources arises due to performance deterioration or due to new traffic which causes a device to be switched back on soon after it has been decided to switch it off. In this case, whilst it is possible that there is enough gain made from this switch off-switch on oscillation, it is also possible that this was not the case and the network was better off not switching off the device at all.

A validation component is now described to address this oscillation effect and only allows oscillation to happen if it is beneficial to the network overall to do so. It will be acceptable to hibernate and emerge again if either the emerging happens far enough into the future for there to have been a significant benefit from hibernation already (i.e. hibernation is a stable action and is likely to prevail until it provides benefit) or the benefit of both actions exceeds the benefit of keeping the device on throughout. In the same manner, it is also possible that certain traffic is rejected because the benefit of turning on a device to support this traffic does not exceed the benefit of keeping the device off and rejecting the traffic. It will be understood that this is an evaluation of gain due to an action and that this is done in order to mitigate rapid oscillations between devices being on and off.

This is an evaluation of the benefit of a change and the likelihood to have to reverse this change because the loss incurred during the switch off period exceeds the benefits of having the device switched off. This can be explained in another way. The network is guaranteed to make an energy saving if it turns a particular device off. However, in doing so, the network risks making a loss, by turning away traffic or being unable to deal with deterioration, due to the fact that the resource has been rendered unavailable in order to make this saving. Therefore, if the network is to stop itself from making this energy saving gain, it must ensure that the gain it can get from not making this change is indeed more beneficial. One way to ensure this is to forecast the likely size of the damage. Associated with any forecast, however, there is a likelihood value that the forecast will not come true as well as an error bracket around the size of the damage estimated. By not simply avoiding the energy saving due to a prediction of demand and instead taking into account the risk of this situation actually coming true, the network decreases its chances of reacting to either a small gain or a false positive. The optimal situation for the network is to stop an energy saving change from being made because the loss from going ahead with the change is: a) big, and b) highly likely. The network does not wish to jeopardise its savings by reacting to a small gain that is highly likely nor to a large gain that is highly unlikely.

This evaluation is done by forecasting into the future. When a change is to be made, it can be prevented from happening if the overall gain is negative. The system described below uses two criteria in our evaluation of the future. A change has to be reversed under two circumstances: performance deterioration and influx in traffic demand, most importantly for the QoS models that the routes support. It is also possible that due to a segment being hibernated, resources are consumed on other routes in order to reroute traffic from the hibernated devices which then minimises the available resources for other QoS models. This is a secondary effect of hibernation.

In the same way, a device will be switched back on again under the two conditions described above. The first is deterioration of existing services and the second is if there is demand growing for the QoS models supported by the route segments that are in hibernation. In making the decision to switch such a segment back on, the benefit of making this change can be traded-off against the loss in not doing so weighted by the likelihood of incurring this loss. If the overall gain from doing so is positive, then the device is turned back on.

By introducing a vetting process using a validation component, the number of unnecessary oscillations can be reduced and the system can learn such behaviour for the future. Once this behaviour is learnt, it can be triggered proactively when the associated trigger conditions are met.

a. Involvement of Validation component in Triggering Hibernation

Once all the traffic is remapped successfully, the method above proposes to proceed with hibernation. This step is now altered in the sense that such a device is made a candidate for hibernation and the decision to switch off is subjected to a further evaluation. This is done by comparing the network condition to the past.

For every device hibernation action, a number of features in the network at the time the decision is executed are recorded, along with information about the decision itself. This can be, for example, one or more of the time of day, geographic location, upstream and downstream neighbours (logical and physical connectivity), the traffic on the network QoS model (across all the routes), the traffic on other QoS models (across the routes), the number of routes that support a given QoS model, a forecast of expected traffic and a forecast of likely outages. The purpose of this information is to characterise the network's environment at the time the change is made. The information continues to be recorded across all the features after the decision is made as well. Note that it is possible that many hibernation decisions can be made shortly after each other and that it might also be important to implement some segmentation to enforce a meaningful linkage between action and consequence.

The process for making this decision is as follows:

The network can operate in one of two modes: energy saving mode which typically is on at night and non-energy saving mode which is active at other times. It is during energy saving mode that the present system here remains engaged and is enabled to make changes in the network. It is possible to not have this distinction and have an energy-saving mode on all the time.

Using the recorded features described above, a secondary intelligent entity (which may be implemented in the same physical entity as the primary decision making process) makes a periodic prediction of the loss incurred from keeping a device off. This prediction comprises of two sets of two predictions:

1) Extent of deterioration and/or size of demand, both in the future.

2) Probability that the network will see deterioration and/or demand at all in the same time period.

This can be evaluated at a periodicity of M time units and for N time periods into the future. For example, the forecast can be made at 1 PM for the next 5 hours and updated every hour to take into account most recent historical information or alternatively made every hour from 1 PM and forecasts only into the next hour. Such a forecast will extend until the time when energy saving mode is to be switched off. For example, if energy saving mode ends at 7 AM to accommodate for peak traffic periods, the forecast will extend till this time after which all devices are triggered out of hibernation and the network runs in full swing as demanded by traffic.

The various features being recorded can be used as the inputs to a function that cumulatively determines both the extent of deterioration and/or demand to be expected as well as the likelihood of seeing any deterioration and/or demand. In the present embodiment, using the sets of predictions, the likelihood of deterioration is multiplied with the extent of deterioration and the likelihood of demand is multiplied with the size of the demand to be expected. The extent of deterioration and the size of demand are quantifiable as costs and the weighting of these values with the corresponding likelihoods provides a risk of making such a loss. A weighted summation of the two results is one way to provide an indication of the loss incurred in keeping the resource in hibernation. For example, a high demand expectation at low likelihood is less risky than a moderate demand expectation at high likelihood. Therefore, a hibernation decision is more likely to go ahead in the first scenario than in the second as there is less risk associated with the first.

In the meantime, the saving gained from hibernating a device can be quantified as well, in the same units as the loss at the same time.

By subtracting the loss factor from the gain factor, the validation component can determine whether or not making the change is a beneficial decision and if so, for how long. Also associated with this evaluation is a minimum gain that must be had for the decision to be justified. This can be, for example, a cost or a duration value. It can be defined that a change is only made if it is forecasted to be a beneficial decision (i.e. {saving incurred from switching off device−loss incurred from switching off device}>0) for a given duration and/or until the cumulative gain reaches a predefined value.

Therefore, when a candidate qualifies for hibernation, instead of going ahead with the hibernation and risking having to reverse this change before making sufficient gain from this change, the further evaluation can take into account the likelihood of having to reverse the change by considering the cost in not doing so along with the likelihood that this cost occurs. Changes are not made unless they are likely to prevail for a minimum beneficial period.

Note that two factors are taken into account in evaluating overall 'gain' in the present embodiment: the first is the actual cost incurred in not reversing the change and the second is the likelihood that this situation becomes a reality (likelihood of occurrence). The cost incurred itself comprises of two aspects: cost of turning away traffic and cost of deterioration, both due to lack of resource from the segment being kept in hibernation. Taking into account the likelihood allows the validation component to weigh the risk of the prediction and take this into account instead of reacting to a prediction that might be a false positive and scuppering the saving made by turning the device off (which is guaranteed). It means that the system only stops the network from making a saving, which it is assured to make by entering hibernation, if there is a high enough likelihood of making a loss in making this change. This provides additional stability and minimises oscillations even further. The evaluation is predictive because it uses forecasts of cost and likelihood to determine, at the present time, whether or not a decision is beneficial, rather than making the decision and waiting to see whether or not there is detriment and then having to react to this using other measures.

b. Involvement of Validation Component in Emerging from Hibernation

The corollary of the above step is that the validation component also vets changes to bring devices back to full functionality as well. This means the same gain function is evaluated. The device is only switched back on if the gain from supporting the incoming/forecasted traffic or ameliorating ongoing/predicted deterioration exceeds the gain from keeping the device off for either a minimum duration and/or by a minimum value.

Note that the gain from supporting traffic/improving deterioration is evaluated in the same way as before: taking into account the size of the prize and weighting this by the likelihood of this situation occurring. The likelihood is an important factor as it weights the confidence in the prediction and reduces the number of responses that are triggered by false positives.

c. Learning Actions Over Time

Another aspect of the validation component addresses repeatability of actions taken. The tests undertaken to determine whether or not a change should be made can be tedious. Therefore, a record is made of the decision made and some features associated with the network condition at the time the decision was made in order to trigger this decision once again in the future when the trigger conditions are met. An associated rule support can also be used to filter rules that are more likely to be successful rather than cause subsequent detriment. For example, the rule miner can learn that a certain device is entered into hibernation at 10 PM in four out of five times in the past month when it was evaluated for hibernation. Therefore, such an action can be automatically triggered at 10 PM in the future until the rule is invalidated. Such rules can be automatically learnt and revised periodically. An alternative action is for the rule miner to instead populate the targeted device list by highlighting the devices that were switched off in the past at a given time at the same time in the future (or when a more comprehensive set of trigger conditions is met).

Wider Applicability

The operation of the validation component (see above) has been described in the context of the present application, which is directed towards the savings in energy costs that can be made by re-routing sessions within a network such that one or more network elements can be deactivated. This application is one of a number of related patent applications which are directed to other techniques which are used to control communications sessions within networks. For example, see the Applicant's co-pending applications EP15275166.5, GB1517110.1, GB1517349.5, GB1605187.2, GB1605188.0, GB1605190.6, GB1605194.8, GB1605199.7, GB1605201.1 and GB1605275.5.

It will be readily apparent to the skilled person that the concept of the validation concept can be applied in a wider manner, that is beyond its use described above in relation to the control of energy usage. Generally speaking, in the co-pending patent applications one or more sessions may be terminated, paused or transmitted using a different class of service in order to provide some form of gain to the network operator. For example a first session may be moved to a lower class of service as long as the first session is still delivered at a specified first quality of service in order that a second session may be delivered in a higher class of service in order to meet a second quality of service level. In a similar manner to that discussed above, there may be an oscillation effect in which changes that are made to the network have to be reverted within a particular timeframe. The use of the validation component mitigates the impact such oscillations. The use of the validation component means that the network will be less likely to make changes to the configuration or operation of the network which lead to short term gains but are also likely to lead to losses in the medium to long term.

A worked example of the system described above is now set out in detail below. This example is split into two parts. The first part is a sample embodiment without the enhancement of the validation component described above. The second part of the example deals specifically with the validation component and its influence on the first part of the example.

The first step in this example is to determine the target list. The granularity of items on this list can vary: it can comprise, for example, devices or interfaces. In the present example, devices are targeted in the following manner. Devices are listed in ascending order of traffic throughput. Some of these throughput values can be forecasted rather than current, for example based on requests for future traffic flows, a model of network behaviour and/or past network behaviour. Optionally, each of these throughput values is aggregated into larger bands of throughput, therefore collecting a number of devices within each band. Within each band of forecasted utilization, the devices are sorted in descending order of energy utilisation. Therefore, this might appear as shown in the sample target list table below:

| Traffic throughput (Mbps) | Device ID | Energy utilization (W) |
|---|---|---|
| B1-B2 | D1 | A1 |
| B1-B2 | D2 | A2 |
| B1-B2 | D3 | A3 |
| B2-B3 | D4 | A1 |
| B2-B3 | D5 | A3 |
| B3-B4 | D6 | A2 |

The table shows that there are currently three devices, D1, D2, D3 in traffic band B1-B2, where B2>B1, with energy utilisations of A1, A2 and A3 respectively where A3>A2>A1. Additionally, there are two devices in the next traffic band B2-B3, where B3>B2, with energy utilizations of A1 and A3 respectively where A3>A1. Finally, there is one device D6 with an energy utilization of A2 within the next traffic band B3-B4 where B4>B3.

Using this method, the first device to be targeted will be D1. It is possible that multiple threads of this system trigger changes for multiple devices simultaneously. However, this might lead to changes that cannot be accounted for against a single cause and therefore is not advised.

The next step is to enumerate the routes (tunnels, VLANs etc.) that device D1 supports. This can be identified from a topology database that network operators typically have. Assume that this lookup informs the intelligence entity that the routes that traverse this device are $\{R1, R2, R3, \ldots R_n\}$. Note that this lookup might have to be done on a per-interface level, depending on how the data is stored.

We assume in this example that a dynamic QoS environment exists where various routes have been profiled into a set of time-variant QoS models. This is not a requirement, however, as already described above. Nevertheless, a dynamic QoS environment is used here in order to demonstrate how this invention can be used in that context.

Using this information, the system can focus firstly on route R1. This route R1 can potentially carry more than one type of traffic. It might be a tunnel with multiple sub-pools, each of which is assigned to a CoS. Alternatively, the traffic on the route might be more homogenous and belong to one CoS, supported by one QoS model. The load balancer is triggered as an application to distribute traffic across similar or better QoS models and/or routes with data about the route's traffic characteristics and route alternatives for the same QoS model as well as for QoS models that are similar or better. Note that the load balancing task might have to undertake several iterations in order to transfer more than one type of traffic (i.e. sub-pool) onto a different set of pathways. The re-labelling of such traffic, if successful, can be done at a central control unit or can be signalled to the clients themselves.

Note that the load balancer used in the present embodiment has the ability to determine the impact of a transition on the existing set of services to which the traffic is transferred. This capability means that, subject to the risk the operator is willing to undertake, any traffic distribution that the load balancer proposes is unlikely to incur any QoS detriment in the near future, for the current service being redistributed and also for existing services on routes to which the load is remapped. However, in case this capability is not available in the load balancer being used, the risk of traffic degradation is higher following a remapping action and the resulting QoS should also be verified in some other fashion before the change is made or closely monitored following the change to reverse it if necessary.

The load balancer produces one of two outcomes. The first outcome is that all the traffic on route R1 is re-routed through an alternative pathway that does not include device D1. In this case, the same is repeated for the next route R2 in the same manner. The second possible outcome is that at some stage in this load balancing process, a traffic flow (which can be considered to be a single session or a group of sessions that form one FEC and desire the same traffic treatment) cannot be routed away from the route on which it currently exists. This can happen at any stage of the iterative process (on a specific traffic flow or a particular route after other traffic has already been load balanced away).

If all the traffic is turned away from device D1, the device can be hibernated.

Alternatively, if the second outcome arises, the device D1 cannot be switched off. Nevertheless, it is possible that the load re-routing that has taken place so far has reduced the energy consumption of the device whilst nominally increasing the energy consumption of other routes onto which the load has been transferred. The overall accumulation of this is the global objective and can be measured by overall energy utilization. Note that energy utilization is a function of traffic flow and therefore, if any changes have taken place in traffic flow between the two points of measurement, this must be adjusted in the measurement so as to not misrepresent causation and consequence. Note also that such models are conditional on the amount of traffic on the network at the time of traffic adjustment. Rates can be represented in Watts per 100 Mbps (W/100Mbps) or per user. Such understanding of traffic and energy utilization are typically available from device manufacturers or published material and therefore, if the total variation in traffic is measured and traffic distributions before and after the change are measured, the total change in energy due to traffic variation can be calculated and taken away from the measured total energy usage in the network segment. The resulting compensated value can be assumed to be due to the load balancing step as described herein. This is explained in more detail as follows.

Assume device D1 currently contains only 1 route R1, which carries 10 Mbps. Assume that the load balancer has found 5 alternative routes (R2, R3, R4, R5, R6) of acceptable QoS to proactively trigger a redistribution of traffic such that the 5 routes carry 2 Mbps each. This incremental change of 2 Mbps onto a single route is referred to as $L_E$. The 5 routes can potentially already be carrying other types of traffic and will have an energy consumption that can be measured before the redistribution change is made. The relationship between traffic and energy utilization can be non-linear and the increment/decrement in energy utilization can depend on the operating point of the device before the change is made. In the meantime, it also possible that the 5 routes have simultaneously experienced increased traffic from other sources (not due to redistribution from route R1). Assume that this increment is a total of 20 Mbps and is referred to as L. Therefore, measuring the energy consumption before and after the redistribution of the routes R1, R2, R3, R4, R5 and R6 can be influenced by two components: 1) external traffic influx, 2) load redistribution from R1. Therefore, in order to determine the overall energy impact of (2), we must subtract the impact of (1) from the overall change before and after the two sub-component changes. It may be assumed, in the absence of further information, that this relationship between traffic and energy utilization is linear on small increments. If energy before is $E_b$ and energy after change is $E_a$, the contribution to the energy change due to load balancing is $$\Delta E = (E_a - E_b) \frac{L_E}{L + L_E}.$$

$\Delta E$ is summed over all the routes where changes have been made, i.e. the local segment affected by the load redistribution, to form $\Delta E_{TOTAL}$ and if $\Delta E_{TOTAL}$ is negative, the change is assumed to be for the better (i.e. towards the global optimum). Alternatively, if it is positive, the change is to be reversed.

The purpose of evaluating the global objective, however it is defined, is to determine whether or not the local change made on traffic flowing through D1 is to the benefit of the global objective. It is possible that the traffic changes made were such that the overall goal diverges from the minimum compared to before the change was made, and therefore it can be reversed to its previous state and return to the global value that was indeed closer to the minimum. The determination of whether or not the change(s) have rendered the system closer or away from the global optimum can be done simply by comparing the energy consumption before the change and the energy consumption after the change (having compensated for the changes due to other traffic variations). If the current value is smaller than the previous value, the change is assumed to have been for the better. Instead, the load balancing changes are reversed by removing the traffic re-labelling entries at the gatekeeper and returning to the previous state as well as recording the characteristics of the attempt made (in order to learn from the occurrence). Such characteristics might include the time of day, the load distribution across routes, route distribution across QoS models, etc. in order to perform rule mining on the dataset at a later stage.

Note also that a change can be made in any number of segments. For example, the intelligence entity can continue making further load balancing changes away from D1, skipping the flow that cannot be re-routed, for N number of iterations to verify that the overall global goal is indeed consistently diverging from the previous minimum.

Alternatively, the load balancing steps can be reversed incrementally, checking after each reversal whether or not the overall objective diverges and stop when M number of iterations is reached and/or if the overall goal continues to diverge. As discussed above, such incremental changes can act to slow down the responsiveness of the system, however they can bring the benefit of being more thorough in searching for local alternatives. Any suitable local search method can be used to trade off against the global objective and the effort involved in making such changes.

The result of these two steps is either that a device is entered into hibernation entirely or the load is routed away from it using any load balancer application, taking into account post-reroute QoS impact, for as long as the overall energy consumption is reduced due to such changes.

Note that once a device has been marked dormant, any devices that are on the same routes which have been re-routed away can also be marked dormant (a method to identify such associated devices has already been discussed). The route segments are marked as dormant in the QoS model database as well as the route topology database. Devices may or may not continue to maintain tunnels whilst they hibernate.

The target list can be updated as the system proceeds through the network to identify devices that are less utilized due to a previous change (i.e. on the same routes upstream/downstream) and therefore once the first change is made, the system is more likely to make easier changes to hibernate associated devices before proceeding to device D2 in the target table above.

The next task is to determine when a device should be triggered out of hibernation. This may be done under two circumstances. The first is where a load balancing step within active routes does not ameliorate QoS deterioration. For example, if the system determines that QoS degradation is occurring or is likely to be experienced on a given QoS model, it attempts to redistribute traffic across other routes as well as other QoS models that are of similar or better QoS performance. The first stage of this is to load balance across routes whilst still maintaining dormant segments as they are. However, if degradation continues, segments of dormant routes belonging to the QoS model can be triggered out of hibernation in order to improve the situation. The order in which this is done is flexible. The load balancing can be done within the same QoS model, following which dormant routes can be switched back on and if degradation still persists, then load balancing across QoS models can be triggered. Alternatively, triggering dormant segments out of hibernation can be done as the last resort. The choice is a trade off in revenue and complexity in both cases for the operator and might depend on factors such as the availability of alternative QoS models, the value of traffic on other QoS models, the saving gained in keeping infrastructure in hibernation, etc. Also, the choice of which segment to turn on can be done in any manner. The smallest dormant segment can be switched back first, followed by the second and so on. Alternatively, all dormant segments can be switched back on for a given QoS model that suffers deterioration. Alternatively, segments on routes with the largest forecasted deterioration can be switched back on first. All of these policies can be used at different times, depending on overall congestion levels. All these alternatives are policies to be made by the operator.

The second instance when a dormant segment is triggered out of hibernation is when there is predicted demand for a given QoS model. Given that such demand is linked to the published QoS models which then reinforces the demand in the future by making resource available to suit that demand and offering this to existing services which might have created that demand in the first place, there is evidently a direct linkage between the demand for a QoS model and its usage, either for existing services or perhaps new services. Therefore, when demand is forecast for a QoS model, based on client requests or scheduled content information, then dormant routes that belong to such QoS models can be triggered awake in advance of the demand actually rising. The present system uses forecasted information to make a different decision in this system of turning back on dormant network segments and incurring an energy cost in order to better serve the incoming requests.

Therefore, the system described herein can trigger devices back into action whilst the network is still performing well by looking into the future in terms of both deterioration as well as demand.

Note that when a device is switched back on, it might be necessary for the gatekeeper to send, along with the trigger, information relating to connectivity to the device itself. This has been described above. Also, once the device has been switched on, the route segment must be marked as active in the model database, as well as the route distribution per model database.

Note also that the network can run in such a mode only for certain times of the day, e.g. at night, in order to reduce risk of changes and QoS challenges during normal/peak traffic times.

As described above, actions can also be learned over time. For example, assume that it is evident from historical data that a device is hibernated regularly at a certain time of day with a support of 80%. Therefore, such behaviour can be learned from pattern mining and this action can be triggered automatically at the time in the future even if the energy-saver learning component is currently engaged with another device or inactive. Alternatively, if a specific load balancing action consistently results in divergence from the global goal, the network conditions under which the load balancing action was attempted as well as the outcome can be recorded in order to prevent the action from taking place in the future. Any number of rules can be learnt by recording a number of features about the network that characterise its condition at the time of a decision in order to imitate that decision without going through the computationally expensive process of repeating that decision in the future. Rules can be filtered such that a minimum confidence and support is required before such an action can be taken without engagement of the energy-saving intelligence component. Alternatively, if such automation is undesirable, the target list can be amended instead of making the change directly, so that the energy-saving learning component can target the devices in a more guided manner and at the appropriate time and create a benefit with less effort rather than potentially exhaustively searching the target list by ascending traffic bands and descending energy utilisation within these bands. The target list can be pruned in any intelligent way.

The second part of this worked example considers the influence of the secondary validation component.

Consider a scenario where there are two elements, D1 and D2, being considered for hibernation. The secondary validation component is triggered in order to finalise this decision. This component can potentially decide which one of the two devices, both or neither, will be hibernated.

These two elements are routers using w Watts of energy when switched on and a further v Watts per unit of traffic transmitted over the device. Typical values are w=1800 W and v can range between 10 and 50 W/Gb/s depending on how much traffic is already transmitted by the device. Usually the increase in v is stronger if the increase is added to smaller amounts of traffic and smaller if the device is already transmitting a large amount of traffic. For reasons of simplicity, we can assume the energy increase is linear in the throughput and the energy consumption of a router is $$E(C)=E_s+E_d(C)=1800 \text{ W}+C \cdot 7.5 \text{ W}$$

where C is the throughput measured in Gb/s.

In order to decide if the switch off is providing a benefit the amount of energy saved over time must be calculated and this saving must be offset against the potential cost of having to decline traffic or incurring penalties through QoS breaches because traffic had to be re-routed.

The network maintains a traffic profile for each element that provides the expected throughput when the element is not switched off. This profile can be a moving average for each time interval, for example, a daily 24 hour profile. Other profiles, like a weekly profile with 7×24 time intervals are possible depending on the operator's preference. The time granularity is also based on the operator's preference and indicates the minimum period a device should be switched off for if the decision is made to switch it off. This discretisation of time prevents unwanted oscillation of devices going in and out of hibernation in short periods of time. The traffic profile of an element can be converted into its energy profile by using E(C).

For the purpose of energy management a table on expected demand, available capacity and expected performance for each QoS model is maintained using the same time granularity as the demand/energy table for an element. By identifying all QoS models that are assigned to routes supported by the element identified for switch off the available demand for each QoS model can be updated by referring to a Model-Route mapping table MR (such as that set out in the table below) and subtracting the capacity assigned to each QoS model on those routes. The data table T shows jitter, loss, and delay statistics for 30 traffic flows. The additional column 'Cluster' indicates the cluster a row has been assigned to by a clustering algorithm applied to the data.

| ID | Route | $t_s$ | $t_e$ | B | Jitter | Loss | Delay | Model | Cluster |
|---|---|---|---|---|---|---|---|---|---|
| 1 | 1 | 13.00 | 13.20 | 9.88 | 3.05 | 0.1487 | 24.72 | 1 | 1 |
| 2 | 2 | 13.05 | 13.15 | 10.18 | 3.03 | 0.1508 | 25.04 | 1 | 1 |
| 3 | 3 | 13.00 | 13.20 | 9.81 | 2.96 | 0.1514 | 24.62 | 1 | 1 |
| 4 | 1 | 13.20 | 13.38 | 9.84 | 2.99 | 0.1518 | 24.64 | 1 | 1 |
| 5 | 2 | 13.24 | 13.40 | 10.04 | 3.03 | 0.1521 | 24.87 | 1 | 1 |
| 6 | 3 | 13.20 | 13.40 | 9.98 | 3.01 | 0.1523 | 24.84 | 1 | 1 |
| 7 | 1 | 13.46 | 14.00 | 9.99 | 2.97 | 0.1530 | 24.60 | 1 | 1 |
| 8 | 2 | 13.40 | 13.44 | 10.13 | 3.06 | 0.1491 | 25.46 | 1 | 1 |
| 9 | 3 | 13.40 | 14.00 | 10.06 | 3.02 | 0.1495 | 24.83 | 1 | 1 |
| 10 | 2 | 13.46 | 13.58 | 10.13 | 2.98 | 0.1474 | 24.59 | 1 | 1 |
| 11 | 4 | 13.00 | 13.20 | 9.84 | 3.98 | 0.1014 | 29.76 | Null | 2 |
| 12 | 5 | 13.05 | 13.15 | 9.88 | 4.04 | 0.1019 | 29.70 | Null | 2 |
| 13 | 6 | 13.00 | 13.20 | 10.17 | 3.94 | 0.1004 | 30.45 | Null | 2 |
| 14 | 4 | 13.20 | 13.38 | 10.01 | 4.01 | 0.1009 | 29.69 | Null | 2 |
| 15 | 5 | 13.24 | 13.40 | 9.83 | 3.93 | 0.1011 | 29.75 | Null | 2 |
| 16 | 6 | 13.20 | 13.40 | 9.93 | 4.06 | 0.0987 | 29.40 | Null | 2 |
| 17 | 4 | 13.46 | 14.00 | 9.96 | 4.04 | 0.0996 | 29.78 | Null | 2 |
| 18 | 5 | 13.40 | 13.44 | 10.14 | 4.01 | 0.0996 | 29.72 | Null | 2 |
| 19 | 6 | 13.40 | 14.00 | 9.95 | 4.01 | 0.0999 | 29.52 | Null | 2 |
| 20 | 4 | 13.46 | 13.58 | 9.89 | 3.93 | 0.1006 | 29.82 | Null | 2 |
| 21 | 7 | 13.00 | 13.20 | 9.84 | 2.49 | 0.2006 | 19.98 | Null | 3 |
| 22 | 8 | 13.05 | 13.15 | 9.99 | 2.48 | 0.2040 | 19.78 | Null | 3 |
| 23 | 9 | 13.00 | 13.20 | 9.94 | 2.47 | 0.1986 | 20.36 | Null | 3 |
| 24 | 7 | 13.20 | 13.38 | 10.01 | 2.49 | 0.1980 | 19.94 | Null | 3 |
| 25 | 8 | 13.24 | 13.40 | 9.97 | 2.50 | 0.1975 | 19.71 | Null | 3 |
| 26 | 9 | 13.20 | 13.40 | 10.11 | 2.54 | 0.2005 | 20.18 | Null | 3 |
| 27 | 7 | 13.46 | 14.00 | 9.84 | 2.49 | 0.1970 | 19.66 | Null | 3 |
| 28 | 8 | 13.40 | 13.44 | 10.13 | 2.52 | 0.2004 | 19.99 | Null | 3 |
| 29 | 9 | 13.40 | 14.00 | 9.88 | 2.48 | 0.1991 | 19.64 | Null | 3 |
| 30 | 7 | 13.46 | 13.58 | 10.11 | 2.53 | 0.2004 | 19.83 | Null | 3 |

In this example, we are considering two devices D1 and D2. D1 supports Routes 1 and 2 and D2 supports Route 3. It is assumed that all three routes connect the same source/destination pair. Extending the example to more routes, sources and destinations is straightforward for the skilled person. The following table shows the peak traffic demand that is predicted to flow over D1 and D2 if they were not to be switched off during the energy saving period between 01.00 and 07.00 in the morning. These numbers are averages for one hour slots calculated over the last 10 days when D1 and D2 were not switched off.

| | Time | | | | | | |
|---|---|---|---|---|---|---|---|
| | ... | 01.00 | 02.00 | 03.00 | 04.00 | 05.00 | 06.00 | ... |
| D1 Peak Demand [Gb/s] | ... | 10 | 8 | 4 | 0 | 5 | 10 | ... |
| D2 Peak Demand [Gb/s] | ... | 40 | 30 | 20 | 10 | 10 | 20 | ... |

The following table shows the predicted peak demand and the probabilities that there will be any demand at all for 3 models M1, M2 and M3 that are supported by routes 1-3. It is assumed that routes 1-3 do not support any other models. The computations have been done in the same way as for the device demand, i.e. as moving averages and frequencies of demand over a period of 10 days. For example, the numbers for M1 tell us that we have observed traffic with a peak demand of 20 Gb/s in all six one hour slots and that we have seen that on exactly one of the last 10 days (it doesn't have to be the same day for each one hour slot) since the probability is 10%, i.e. 1 out of 10 days.

|  | Time | | | | | | |
|---|---|---|---|---|---|---|---|
|  | ... | 01.00 | 02.00 | 03.00 | 04.00 | 05.00 | 06.00 ... |
| Peak M1 Demand [Gb/s] | ... | 20 | 20 | 10 | 10 | 20 | 20 ... |
| M1 p(D > 0) | ... | 0.1 | 0.1 | 0.1 | 0.1 | 0.1 | 0.1 ... |
| M1 p(D > 0 × Demand | ... | 2 | 2 | 2 | 2 | 2 | 2 ... |
| Peak M2 Demand [Gb/s] | ... | 30 | 20 | 10 | 0 | 0 | 10 ... |
| M2 p(D > 0) | ... | 0.7 | 0.5 | 0.2 | 0 | 0 | 0.2 ... |
| M2 p(D > 0 × Demand | ... | 21 | 10 | 2 | 0 | 0 | 2 ... |
| Peak M3 Demand [Gb/s] | ... | 10 | 10 | 10 | 10 | 10 | 10 ... |
| M3 p(D > 0) | ... | 0.8 | 0.8 | 0.4 | 0.4 | 0.4 | 0.8 ... |
| M3 p(D > 0 × Demand | ... | 8 | 8 | 4 | 4 | 4 | 8 ... |

The table below shows the energy and energy cost used by devices D1 and D2 based on the predicted demand.

|  | Time | | | | | | |
|---|---|---|---|---|---|---|---|
|  | ... | 01.00 | 02.00 | 03.00 | 04.00 | 05.00 | 06.00 ... |
| D1 energy usage | ... | 1875 | 1860 | 1830 | 1800 | 1837.5 | 1875 ... |
| D1 energy cost | ... | 0.26 | 0.26 | 0.26 | 0.25 | 0.26 | 0.26 ... |
| D2 energy usage | ... | 2100 | 2025 | 1950 | 1875 | 1875 | 1950 ... |
| D2 energy cost | ... | 0.29 | 0.28 | 0.27 | 0.26 | 0.26 | 0.27 ... |

The table below shows the capacities allocated to the models:

| Model | Global [Gb/s] | Route 1 [Gb/s] | Route 2 [Gb/s] | Route 3 [Gb/s] |
|---|---|---|---|---|
| M1 | 100 | 40 | 40 | 20 |
| M2 | 100 | 0 | 20 | 80 |
| M3 | 100 | 50 | 40 | 10 |

Using the information provided in the tables above the impact of switching each of D1 and D2 into a hibernation mode can be calculated as set out in the table below.

| Model | D1 switch off - remaining capacity [Gb/s] | D2 switch off - remaining capacity [Gb/s] |
|---|---|---|
| M1 | 20 | 80 |
| M2 | 80 | 20 |
| M3 | 10 | 90 |

If D1 is switched off, the product of the likelihood of having demand times the predicted peak demand does not exceed the available remaining demand for models M1-3. That means we expect that traffic that wishes to use these models on the routes impacted by the switch off of D1 can be successfully routed elsewhere using the remaining capacity of the models for all six time slots.

Looking at D2 shows that switching off D2 would leave only 20 Gb/s capacity for M3 in the 01.00 slot where there is a weighted prediction of 21 Gb/s. However, the remaining 5 time slots show less predicted demand and would provide enough capacity. By comparing the energy savings between D1 and D2, D1 is the better choice and we select D1 for switch off.

Based on the information in the above example, different decision scenarios can be envisaged. D1 has less predicted demand and the system would identify it before identifying D2 as a candidate for switch off or hibernation. However, as illustrated above, a number of options can be evaluated concurrently. If it is decided to switch off D2, there is a probability of 70% that M3 experiences some traffic and peak demand of 30 Gb/s has been seen in the past 10 days. That means there is a chance that there will be enough traffic to cause a breach in QoS. The system can still decide to switch off D2 if the cost of breaching QoS or rejecting traffic is lower than the savings the time slot at 01.00 provides.

Instead of using the probabilities, an alternative system can use only the predicted peak demand to make the decisions or different ways of predicting demand can be used, like average peak traffic, average traffic, peak traffic weighted by value or desirability of traffic etc. No matter what traffic prediction we use the principles of the above illustrated decision process remain the same.

The first part of the example described conditions under which an element is switched back on. This is then enhanced with the secondary validation component in the same manner as the decision to hibernate. The secondary validation component can be triggered whenever a device or segment is marked to be switched back on and can prevent this action from taking place. The decision process to switch a device back on if deterioration is detected can use the same information plus the cost of the detected deterioration. If the cost of switching the device back on is higher than the cost of the deterioration, the device remains switched off. Otherwise, it will be switched back on.

Figure 3:
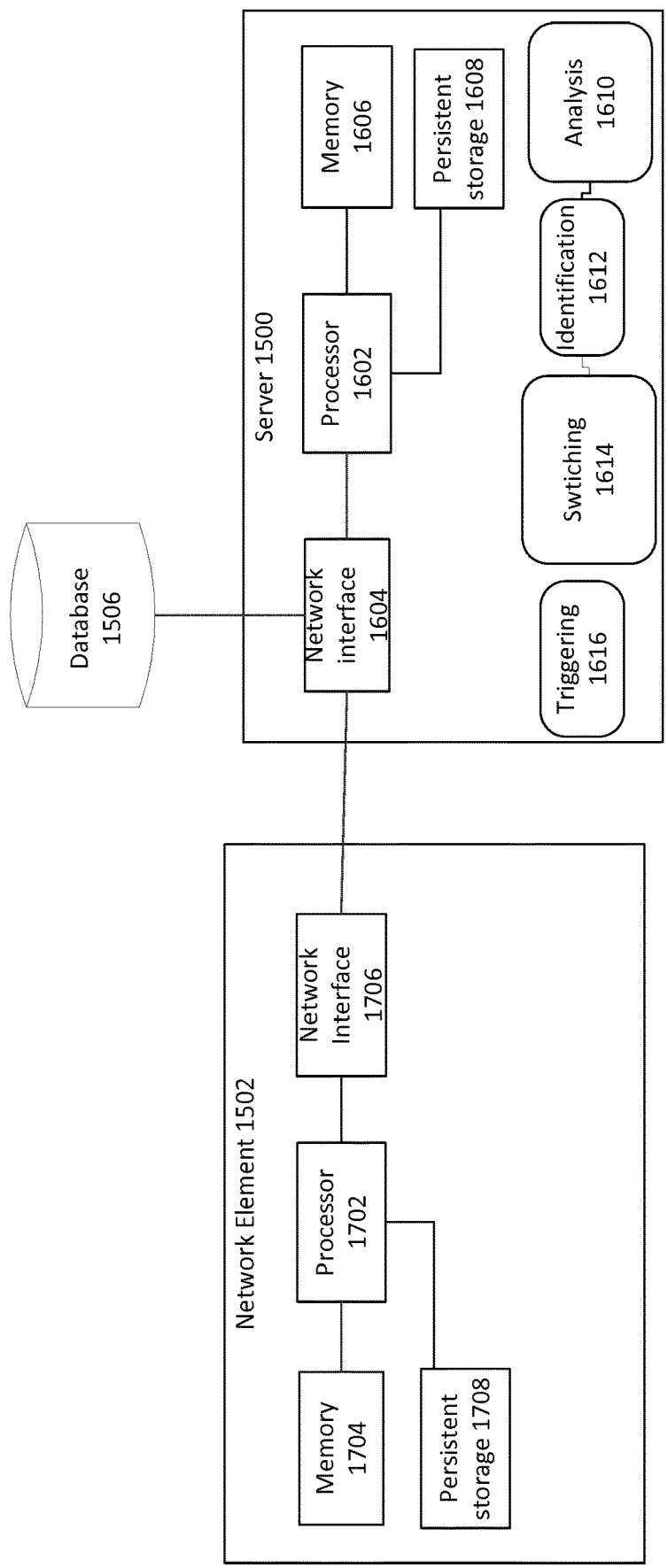
FIG. 3 is a schematic diagram of hardware that may be used to implement the methods described herein according to one embodiment.

FIG. 3 illustrates hardware architecture that may be provided to implement the network management methods described herein, which is illustrated as a server 1500. The server may be implemented as part of a gateway component in the network. The server includes one or more processors 1602 together with volatile/random access memory 1606 for storing temporary data and software code being executed.

A network interface 1604 is provided for communication with other system components (e.g. client, database 1506 and core network components) over one or more networks (e.g. Local or Wide Area Networks, including the Internet). The database 1506, which may be implemented within or external to the server 1500, may be used to store information such as the status of and routes associated with hibernated network elements, parameters relating to the network or to individual devices, QoS models and their associated parameters and data relating to the past preferences and behaviour of clients and the network.

Persistent storage 1608 (e.g. in the form of hard disk storage, optical storage and the like) persistently stores analysis software for performing the functions, including an analysis process 1610, a route and QoS identification process 1612, a switching process 1614 and a triggering process 1616. Further optional monitoring processes may also be provided. The persistent storage also includes other server software and data (not shown), such as a server operating system.

The server will include other conventional hardware and software components as known to those skilled in the art, and the components are interconnected by a data bus (this may in practice consist of several distinct buses such as a memory bus and I/O bus).

A network element 1502 may also be provided, including one or more processors 1702 together with volatile/random access memory 1704 for storing temporary data and software code being executed.

A traffic flow for which the network element is requesting a path through the network may originate at the network element 1502 or may be received by the client via the network interface 1706. Communication is also provided to the server 1500 via the same or a separate network interface 1706 (but is illustrated herein as a single interface). The network interface communicates over one or more networks (e.g. Local or Wide Area Networks, including the Internet).

Persistent storage 1708 (e.g. in the form of hard disk storage, optical storage and the like) persistently stores software for performing the functions of the client.

The network element will include other conventional hardware and software components as known to those skilled in the art, and the components are interconnected by a data bus (this may in practice consist of several distinct buses such as a memory bus and I/O bus).

While a specific architecture is shown by way of example, any appropriate hardware/software architecture may be employed.

Furthermore, functional components indicated as separate may be combined and vice versa. For example, a database 1506 may be stored at the server 1500 (e.g. in persistent storage 1608) or may be provided as a separate database server. Furthermore, the functions of server 1500 or network element 1502 may in practice be implemented by multiple separate server devices. The network element 1502 may also store or have access to a database.

The invention claimed is:

1. A network management method for managing energy utilisation in a network comprising a plurality of network elements for handling network traffic, the method comprising:
   analyzing the network elements to identify, based on a ranking, at least one candidate network element for energy usage reduction, the analyzing comprising steps of:
      grouping the network elements into a plurality of traffic utilization bands according to a level of traffic utilization at each network element; and
      ranking the network elements within a traffic utilization band based on their level of energy utilization;
   identifying routes passing through the at least one candidate network element;
   identifying at least one alternative route for each identified route;
   switching each identified route onto the at least one alternative route, wherein the alternative route does not pass through the at least one candidate network element; and
   triggering the at least one candidate network element to enter a lower power mode.

2. The method according to claim 1 wherein identifying routes passing through the at least one candidate network element comprises identifying a quality of service level associated with each identified route.

3. The method according to claim 2 wherein identifying at least one alternative route comprises identifying at least one alternative route having an associated quality of service level equal to or better than the quality of service level associated with each identified route.

4. The method according to claim 1 wherein analysing the network elements comprises identifying one or more network elements in the network having a low traffic utilisation and a high energy utilisation.

5. The method according to claim 1 wherein identifying a quality of service level associated with each identified route comprises performing a lookup based on each identified route to determine a quality of service or a class of service associated with each route.

6. The method according to claim 1 further comprising determining an initial global energy utilisation of the network prior to analysing the network elements and determining a revised global energy utilisation of the network subsequent to switching each identified route onto the at least one alternative route.

7. The method according to claim 6 further comprising reversing the switching of each identified route, and reactivating one or more network elements if the revised global energy utilisation is greater than the initial global energy utilisation.

8. The method according to claim 1 further comprising monitoring the performance of a plurality of quality of service models in the network to determine or identify a deterioration in the performance of at least one quality of service model.

9. The method according to claim 1 further comprising determining a gain associated with triggering a network element to enter a low power mode, wherein the gain is determined based on an amount of energy saved by triggering the network element to enter the low power mode.

10. The method according to claim 1 further comprising determining a loss associated with maintaining a network element in a low power mode.

11. The method according to claim 1 further comprising establishing and maintaining, based on past network behaviour, one or more rules for triggering a network element into a low power mode or reactivating a network element.

12. A non-transitory computer readable medium comprising software code adapted, when executed on a data processing apparatus, to perform a method as set out in claim 1.

13. An apparatus for managing energy utilisation in a network comprising a plurality of network elements for handling network traffic, the apparatus comprising:
   a memory for storing a sequence of instructions for implementation on a processor;
   an interface for receiving information from and communicating information to network elements in the network;
   a processor for implementing the sequence of instructions to:
   analyze the network elements to identify, based on a ranking, at least one candidate network element for energy usage reduction, wherein, to analyze the network elements, the processor is at least configured to:
      group the network elements into a plurality of traffic utilization bands according to a level of traffic utilization at each network element; and
      rank the network elements within a traffic utilization band based on their level of energy utilization;

identify routes passing through the at least one candidate network element;

identify at least one alternative route for each identified route;

switch each identified route onto the at least one alternative route, wherein the alternative route does not pass through the at least one candidate network element; and trigger the at least one candidate network element to enter a lower power mode.

14. The method according to claim 10 further comprising determining a loss associated with maintaining a network element in a low power mode, wherein the loss comprises a traffic loss.

15. The apparatus according to claim 13 wherein the processor is further configured to identify routes passing through the at least one candidate network element by identifying a quality of service level associated with each identified route; and wherein the identification of at least one alternative route comprises identification of at least one alternative route having an associated quality of service level equal to or better than the quality of service level associated with each identified route.

16. The apparatus according to claim 13 wherein the processor is further configured to determine an initial global energy utilization of the network prior to analyzing the network elements and determine a revised global energy utilization of the network subsequent to switching each identified route onto the at least one alternative route.

17. The apparatus according to claim 16 wherein the processor is further configured to reverse the switching of each identified route, and reactivate one or more network elements if the revised global energy utilization is greater than the initial global energy utilization.

18. The apparatus according to claim 13 wherein the processor is further configured to determine a gain associated with triggering a network element to enter a low power mode, wherein the gain is determined based on an amount of energy saved by triggering the network element to enter the low power mode.

19. The apparatus according to claim 13 wherein the processor is further configured to determine a loss associated with maintaining a network element in a low power mode, wherein the loss comprises a traffic loss.

* * * * *